United States Patent [19]
Gill et al.

[11] 3,851,766
[45] Dec. 3, 1974

[54] PROGRAMMABLE HYDRAULIC DRIVE SYSTEM FOR TRANSPORTING ARTICLES

[75] Inventors: Thomas R. Gill, Cleveland, Ohio; Daniel Bailly, Ayieu, France

[73] Assignee: G S Equipment Company, Cleveland, Ohio

[22] Filed: Oct. 21, 1971

[21] Appl. No.: 191,253

[52] U.S. Cl..................... 212/20, 212/125, 60/426, 318/467
[51] Int. Cl. .......................................... B66c 17/00
[58] Field of Search ........... 212/125, 20, 25, 26, 11, 212/124; 60/52 R; 318/467, 568, 601, 162, 600

[56] References Cited
UNITED STATES PATENTS

| | | | |
|---|---|---|---|
| 2,898,483 | 8/1959 | Muller | 318/467 |
| 2,906,413 | 9/1959 | Minty | 212/25 X |
| 2,909,769 | 10/1959 | Spaulding | 318/601 X |
| 3,018,902 | 1/1962 | Minty | 212/20 |
| 3,178,716 | 4/1965 | Slatin | 318/568 X |
| 3,366,016 | 1/1968 | Anderson | 60/52 R |
| 3,584,201 | 6/1971 | Pons | 318/601 X |

Primary Examiner—Richard A. Schacher
Assistant Examiner—H. S. Lane
Attorney, Agent, or Firm—Watts, Hoffman, Fisher & Heinke Co.

[57] ABSTRACT

A crane drive system including a fluid crane motor for driving a carriage member to selected ones of a plurality of work stations and a fluid motor for actuating a hoist mechanism. A variable delivery pump drives the motors to a closed loop hydraulic circuit which includes control valves for starting and stopping the motors. Variable speed control of either or both motors is accomplished by varying the output of the pump. The control valves are actuated to selected positions by a programmable control system. The control system includes a comparator circuit for comparing a pattern of electrical signals representative of the actual position of the carriage member with a pattern of signals representative of the position of a preselected work station. An output signal having a value representative of the difference between the values of the two patterns of signals is developed by the comparator circuit. This output signal is then applied to a control valve for starting the crane motor to drive the carriage member to the preselected work station.

12 Claims, 11 Drawing Figures

INVENTORS
THOMAS R. GILL
DANIEL BAILLY
BY
Watts, Hoffmann, Fisher & Heinke
ATTORNEYS

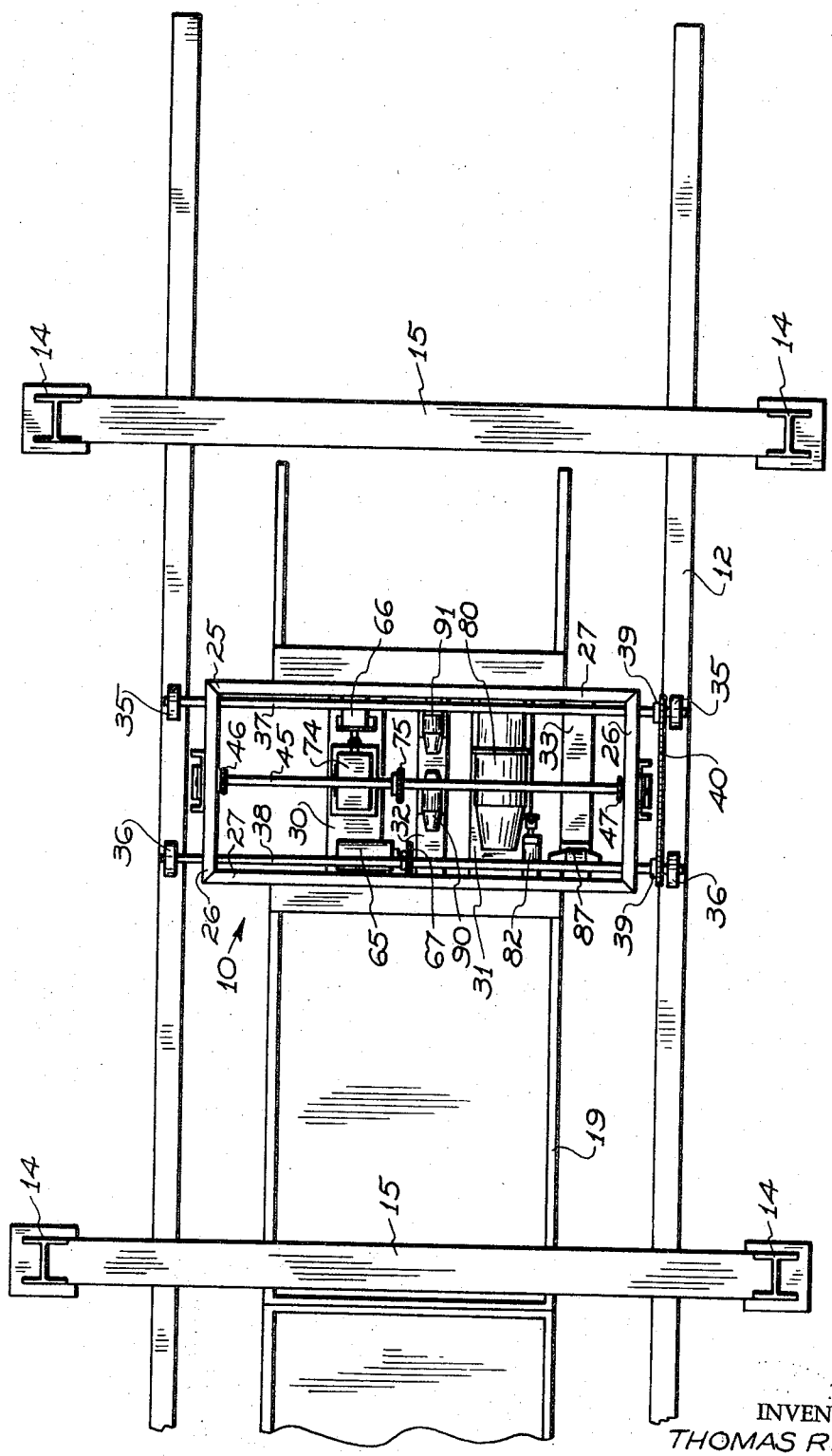

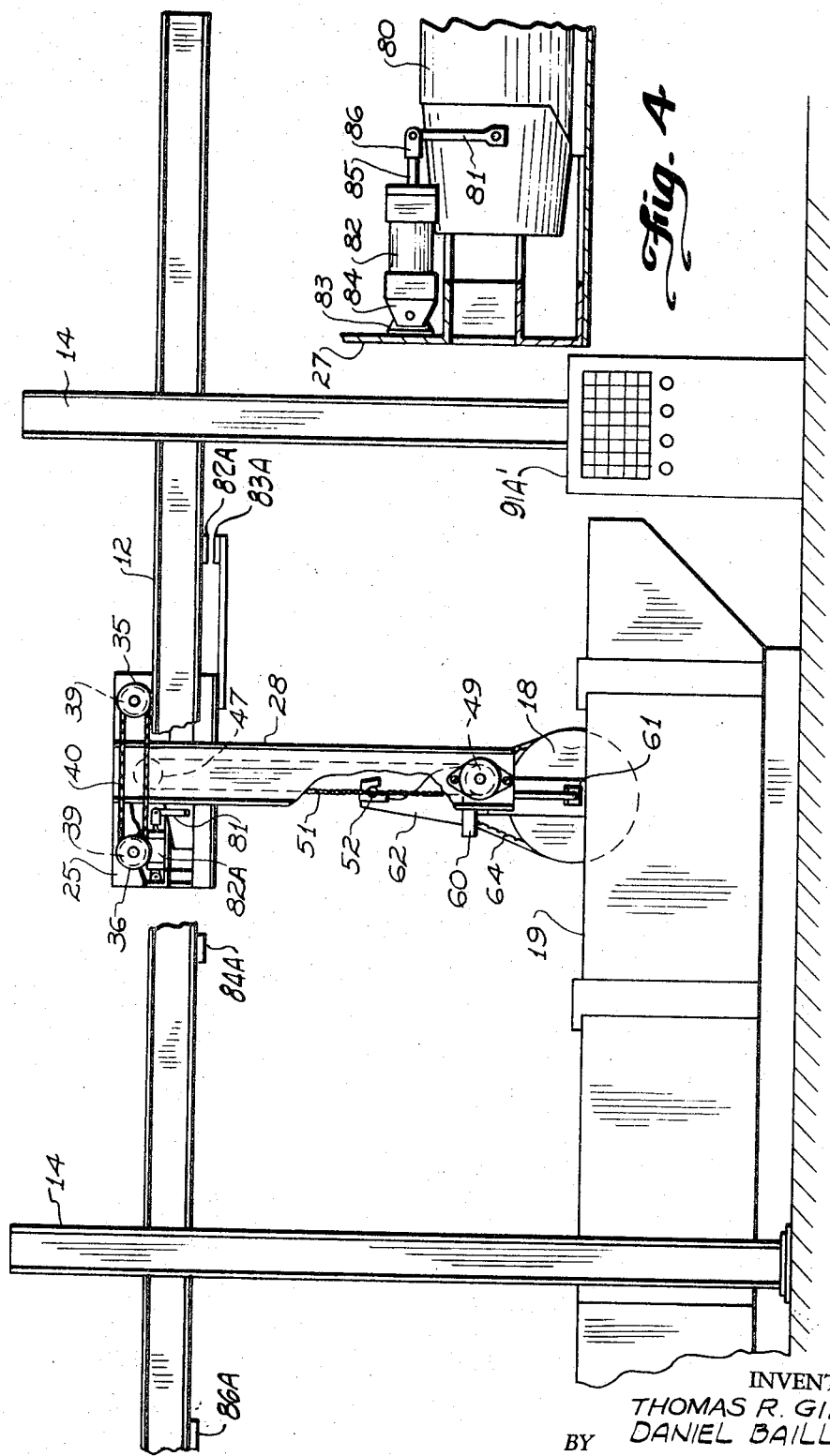

3,851,766

PROGRAMMABLE HYDRAULIC DRIVE SYSTEM FOR TRANSPORTING ARTICLES

CROSS REFERENCES TO RELATED PATENT APPLICATIONS

U.S. Pat. application Ser. No. 103,650, to Thomas R. Gill, entitled, "Variable Speed Hydraulic Drive System," filed Jan. 4, 1971 and assigned to the same assignee as the subject invention.

U.S. Pat. application Ser. No. 150,707 to Daniel Bailly, entitled, "Programmable Control System for Article Transporting Apparatus," filed June 7, 1971, and assigned to the same assignee as the subject invention.

BACKGROUND OF THE INVENTION

The present invention relates generally to a programmable hydraulic drive system, and more specifically to a programmable variable speed, closed-loop hydraulic drive system for powering cranes and similar apparatus.

Conventional cranes employ an electric brake motor to impart horizontal motion and a second electric brake motor to actuate the hoist mechanism of the apparatus. The electric motor drives include starters, relays, etc. for regulating the operation of the motors, and brakes, limit switches, etc. are required for stopping the crane as desired.

Motorized crane apparatus of the type generally described present severe maintenance problems which result from repeated stopping and starting of the electric motor. The frequent stopping and starting of the electric motors is detrimental to their operation and causes motor failure. The brakes used to stop the crane require frequent adjusting and must be replaced periodically. The electro-mechanical starters and relays which are used to regulate the operation of the hoist motor are still another source of failure and require continual maintenance. All of these maintenance problems are particularly severe in modern automated crane systems because of the increased frequency of the start-stop cycles.

Conventional program control systems for cranes include a control circuit comprised of numerous individual circuits each for providing a single control function or operation. It is possible to program the individual circuits to carry out a desired sequence of operations by interconnecting the circuits in a preselected manner. As is apparent, as the number of operations is increased, the interconnections between the individual circuits become more complicated. If a process requires numerous process steps or operations, the interconnections between the individual circuits is very complex. As many as 200 to 300 "jumper" wires may be required to program such a process.

If the control system is only utilized to carry out a single process, and if the process is to remain unchanged during the life of the control system, the "jumper" wires may be permanently connected by a technician during the manufacture of the control system. On the other hand, if the process is one which is changed from time to time, such as an article plating process, it is necessary that the "jumper" wires be disconnected and reconnected to program each new process. It is necessary for a technician to study in detail each new process, decide upon the appropriate interconnections between circuits, actually travel to the location of the process control system, and connect each of the 200 or so "jumper" wires to the appropriate circuits. Thus, the user of such equipment incurs a rather substantial service expense each time a new process is desired.

Also, in these conventional control systems, it is necessary to program each and every process step. In other words, if it is desired to have the article transporting carriage move in a forward direction to a particular work station, numerous "jumper" wires are connected to program the direction of movement of the carriage. Also, additional "jumper" wires are required to cause the carriage to stop at the selected work station. Thus, instead of merely programming the control system so that the carriage would move to the selected work station, it is necessary to program the direction of travel into the control system, as well as the necessary information to cause the carriage to stop at the selected station. As is apparent, the complexity of a program is to a large extent dependent upon the number of commands which must be individually programmed into the control system in order to carry out a desired process.

SUMMARY OF THE INVENTION

The present invention provides a programmable closed-loop hydraulic drive system which is used to power cranes or similar apparatus in place of the conventional electric brake motor drive arrangements with individual program circuits. As will be apparent from the following description, the hydraulically driven crane apparatus of the invention eliminates the maintenance problems, as well as the complicated and time consuming programming problems, and other disadvantages associated with the electric motors, program control circuitry and mechanical brakes of conventionally driven cranes.

The new crane drive system is characterized by a variable displacement pump which drives fixed, positive displacement fluid motors in a closed loop hydraulic circuit. Directional valves are included in the closed loop circuit for controlling the operation of the hydraulic motors which drive the crane horizontally and actuate the hoist mechanism. The variable delivery pump is driven by a continuously running electric motor. Since the pump motor runs continuously, it is not subject to the severe duty imposed by frequent start-stop cycles.

Variable speed control of both hydraulic motors is obtained by varying the displacement of the pump and thereby controlling the delivery of fluid to the motors. The fluid is delivered to the motors under pressure as required by the load and up to the maximum pressure setting of adjustable relief valves which are included in the closed loop hydraulic circuit. The maximum output torques of the fluid motors are controlled by pre-setting the relief valve pressures so that any overload will cause a stall and thus prevent damage to the crane apparatus.

Conventional mechanical brakes have been eliminated, and starting and stopping of the hydraulically driven crane apparatus is accomplished by controlling the output of the variable delivery pump and/or by operation of the directional control valves associated with the fluid motors. The low inertia of the rotating members in the hydraulic system assures smooth and fast starting, stopping and reversals of movement. Smooth starts from zero to any desired speed within the speed range of the fluid motors are obtained with gradual acceleration and deceleration.

The closed loop hydraulic circuitry which characterizes the new drive arrangement of this invention makes it ideally suited for operating cranes used in the plating industry to transport plating barrels, buckets or racks between open tanks which contain electrolyte, rinsing solutions, and other liquid baths. Conventional open loop hydraulic circuits include a large, open reservoir from which a pump draws its fluid supply and into which the fluid is discharged. Such an arrangement cannot be used in the plating industry because of the danger of the plating solutions being contaminated by spillage from the reservoir during starting and stopping of the crane. In the drive arrangement of this invention, the fluid from the hydraulic motors is returned directly to the pump in a closed loop rather than to a separate reservoir. Consequently, the danger of contamination is not present.

The crane includes a programmable control system for controlling the operation of the directional valves. The control system generally includes a plurality of positioning sensing devices for developing a pattern of electrical signals representative of the horizontal position of the crane along a workpath, and a programmable device including a program board and a control circuit having a plurality of circuit connection elements positioned on the board at positions corresponding to the positions of the work stations along the workpath. The programmable device also includes an output circuit for developing a pattern of signals corresponding to a preselected program and actuatable switching devices, such as diodes, for completing selected ones of the circuit connections in order to program the control circuit.

The control system also includes a comparator circuit for comparing the pattern of signals representative of the actual position of the carriage with the pattern of program signals for developing an output signal representative of the difference between the values of the patterns of signals. The comparator circuit is, in turn, coupled to a motor control circuit for applying a control signal to the motor corresponding to the signal developed by the comparator circuit in order to energize the motor for driving the carriage member from the actual position to a preselected work station.

The position sensing devices include circuitry for developing a pattern of digital signals and the control system also includes a digital-to-binary coder for converting the pattern of digital signals to a pattern of binary signals which are then applied to the comparator circuit.

The output circuit of the programmable device develops a pattern of binary signals representative of the position of the preselected work station which are in turn applied to the comparator circuit.

There is also provided a method of controlling the operation of an article transporting apparatus. The method includes the steps of developing a pattern of signals representative of the actual position of an article transporting carriage, developing a pattern of signals representative of the position of a selected work station along a workpath, comparing the values of the two patterns of signals, and energizing a closed loop hydraulic motor to drive the carriage member from its actual position to a preselected work station.

Other advantages and a fuller understanding of the invention will be had from the following detailed description and the accompanying drawings.

BRIEF DESCRIPTION OF THE DRAWINGS

FIG. 2 is a diagrammatical, top plan view of the apparatus shown in FIG. 1;

FIG. 3 is a diagrammatical, side elevational view with portions broken away of the apparatus shown in FIG. 1;

FIG. 4 is a fragmentary, enlarged view of a portion of the apparatus shown in FIG. 3;

DESCRIPTION OF THE PREFERRED EMBODIMENT

Figure 1:
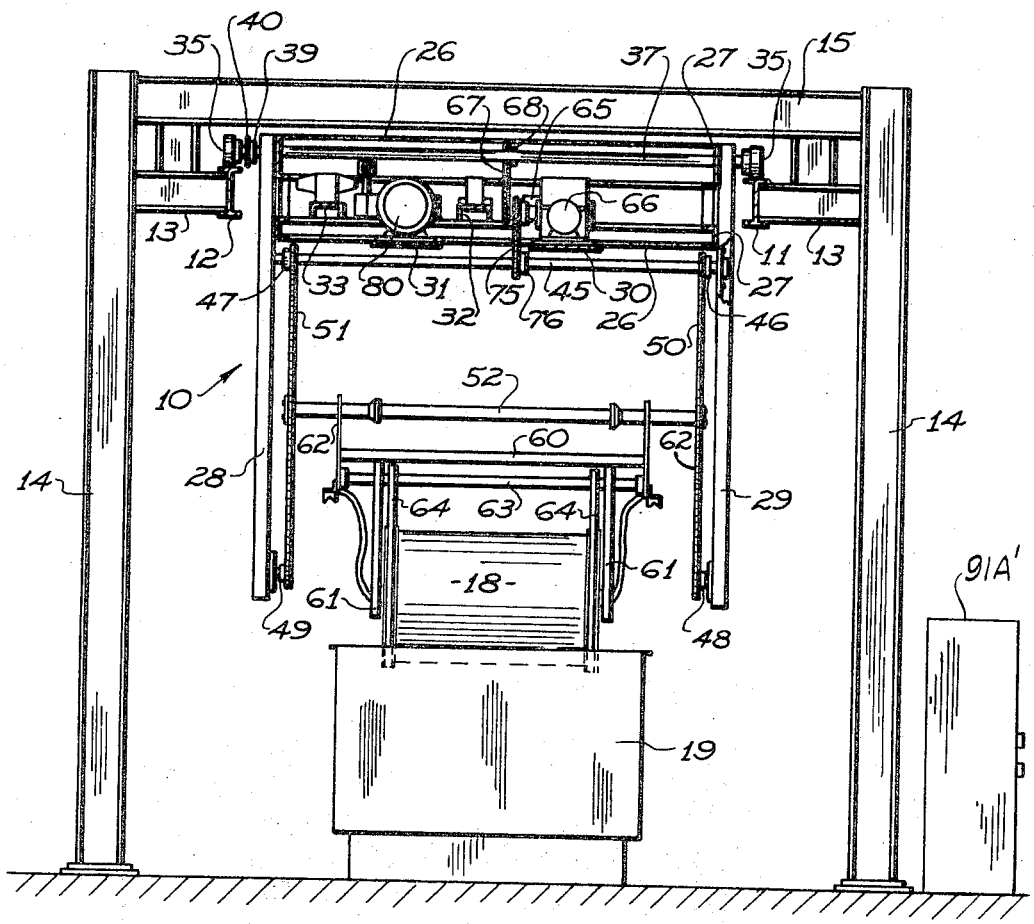
FIG. 1 is a vertical elevational view, partially in cross-section, showing a plating line including a hydraulically driven crane apparatus according to the present invention.

Referring now to the drawings, and to FIGS. 1-3 in particular, the present invention is shown as embodied in an overhead crane 10 which is movable along a runway formed by spaced rails 11, 12. The spaced rails 11, 12 may be supported in any suitable manner, as by horizontal beams 13 which are part of a structural framework that further includes vertical beams 14 connected at their upper ends by horizontal cross beams 15.

For purposes of describing the invention, the crane 10 is illustrated as being operable to carry a plating barrel 18 along a plating line for processing of the parts in the barrel at a series of stations. The plating line will be understood to be made up of a plurality of aligned, open tanks 19 which contain various liquid baths, such as water rinse baths, cleaner solutions, plating solutions, etc. In operation, the crane 10 is stopped at a desired station above a tank and the barrel 18 is lowered and rotated in the bath. After processing for a suitable length of time, the barrel is raised from the tank and the crane is moved along the runway formed by the rails 11, 12 to the next station where the operation is repeated.

As shown, the crane 10 is comprised of a support or frame 25 formed by suitable structural members, including beams 26 which define the ends of the frame and beams 27 which define the sides of the frame. Beams 28, 29 are secured to the opposite sides of the frame 25 and extended downwardly. Plates 30, 31 and a pair of channel members 32, 33 for supporting the crane drive system and reinforcing the frame 25 extend between and are secured to the end beams 26. The support or frame 25 is mounted for movement along the rails 11, 12 by two sets of wheels 35, 36 which are carried on the ends of shafts 37, 38, respectively. The shafts 37, 38 extend across the frame 25 and are journaled in bearings supported by the side beams 27. Sprockets 39 are fixed on the shafts 37, 38 and are connected by a chain 40.

The crane 10 also includes a chain hoist or lift for raising and lowering the barrel 18. The chain hoist or lift arrangement comprises a rotatable shaft 45 extending between the vertical beams 28, 29 of the crane, an upper pair of sprockets 46, 47 mounted on the shaft 45 near its ends, and a lower set of sprockets 48, 49 which are adjustably connected to the beams 28, 29 near their lower ends. The sprockets 46, 48 are connected by an endless chain 50, and the sprockets 47, 49 are connected by an endless chain 51. A lift bar 52 for supporting the barrel 18 has its ends connected to the chains 50, 51 so that the bar will be raised and lowered with movement of the chains.

The barrel 18 may be supported by the lift bar 52 in any suitable manner. In the illustrated arrangement, the barrel supporting structure is comprised of a frame 60 including a pair of depending legs 61 which serve to rotatably mount the barrel 18 at its ends. The frame 60 also includes a pair of hooks 62 which extend upwardly for engagement over the lift bar 52. The barrel 18 may be rotatably driven by means of a shaft 63 which is rotatably carried by the frame 60 and is operatively connected to the ends of the barrel 18 by a belt drive 64. The shaft 63 has a gear (not shown) at one end which is adapted to be engaged by cooperating gear drives (also not shown) mounted at the sides of the tanks 19 at each station. When the barrel is lowered into any of the tanks, the gear on the end of the shaft 63 is engaged with the gear drive at the side of the tank to rotate the barrel 18.

In accordance with the present invention, the crane 10 is reversibly driven along the rails 11, 12 by a fixed, positive displacement fluid motor 65, and the chain lift is actuated by a similar fluid motor 66. As shown in FIGS. 1 and 2, the crane fluid motor 65 is supported on the plate 30 of the frame 25 and is drivingly connected to the wheel shaft 38 by a chain 67 which is engaged around a sprocket on the fluid motor shaft and a sprocket 68 on the wheel shaft. The lift motor 66 is coupled to a worm gear speed reducer unit 74 mounted on the plate 30 which drives a chain 75 engaged around a sprocket 76 on the shaft 45. The speed reducer 74 has a low lead angle, preferably 10 degrees or less, on the worm, whereby the unit will prevent the hoist load from falling.

The fluid motors 65, 66 are driven by a hydraulic drive unit 80 which is supported on the plate 31 of the crane frame 25. As will be explained in greater detail, the output speed of both motors is regulated by controlling the supply of hydraulic fluid from the unit 80. To this end, the unit 80 includes an external control arm 81 which is best shown in FIG. 4. The control arm 81 may be selectively positioned by actuation of a piston-cylinder unit 82 to vary the delivery of fluid from the unit 80. The piston-cylinder unit 82 is pivotally mounted on one of the beams 26 by a bracket 83 and a clevis 84. The piston rod 85 of the unit 82 is connected by a clevis 86 to the control arm 81. The speed regulating, piston-cylinder unit 82 is actuated by fluid supplied from the drive unit 80 through a solenoid-operated, directional valve 87 mounted on the channel member 33 of the crane frame 25.

Starting and stopping of the motors 65, 66 may be selectively controlled by solenoid-operated directional valves 90, 91, respectively, which are in circuit relation between the motors and the drive unit 80. As shown in FIG. 2, the valves 90, 91 are supported on the channel member 32 of the crane frame 25. Control of the operation of the valves is carried out by programmable control circuitry within the cabinet 91A'.

As illustrated in FIG. 3, mounted at spaced intervals on the rail 12 are a plurality of magnetically actuated switches 82A, 84A, 86A. A permanent magnet 83A is supported by a boom P5 extending from the lower portion of the support or frame 25. Each of the switches 82A, 84A, 86A is positioned such that the switch is actuated to a closed position when the beams 28, 29 are positioned substantially over the center of a corresponding one of the plating tanks 19.

Figure 5:
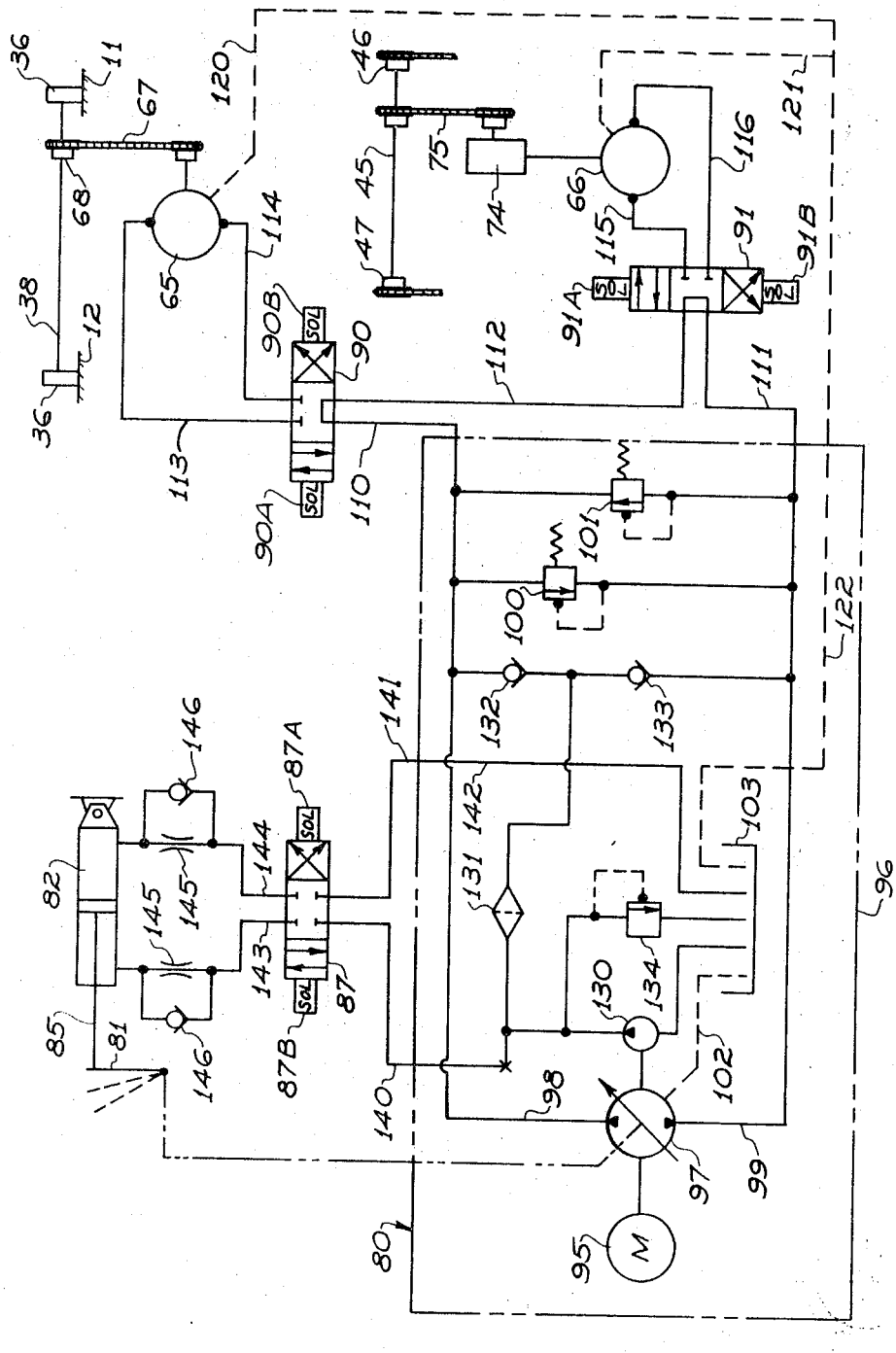
FIG. 5 is a schematic of the hydraulic circuit embodied in the crane apparatus.

Reference is now made to FIG. 5 which is a schematic of the drive unit 80 and of the closed loop hydraulic circuit including the drive unit, the motors 65, 66, the piston-cylinder unit 82, and the associated directional valves. For purposes of clarity, the external system lines of the hydraulic circuit which connect the motors, control valves, etc. have not been shown in FIGS. 1-3.

The drive unit 80 is a commercially available, self-contained unit consisting of a pump motor 95 and an integral hydraulic circuit enclosed within a housing which is represented by the broken line 96. The integral hydraulic circuit of the unit 80 comprises a variable delivery piston pump 97 which is driven by the motor 95 and which is ported to housing passages 98, 99. Cross-line adjustable relief valves 100, 101 are provided between the passages 98, 99, and a drain line 102 connects the pump 97 to a reservoir 103 within the housing 96.

The fluid motors 65, 66 are in series connection with the pressure passages 98, 99 of the drive unit 80. Each of the motor control, solenoid-operated valves 90, 91 is a three-position, four-way directional valve. The pressure passage 98 of the drive unit 80 is connected to a port of the motor control valve 90 by a system line 110, and the pressure passage 99 is connected to a port of the motor control valve 91 by a system line 111. The valves are connected by a system line 112 so that, when the valves are in their illustrated center positions, fluid supplied from the pump 97 through the pressure passage 98 will flow through the valves and return to the pump through the other pressure passage 99. The cylinder ports of the valve 90 are connected to the motor 65 by system lines 113, 114 so that the motor can be driven in either direction by selective energization of the valve solenoids 90A, 90B to actuate the valve between its two operative positions. The cylinder ports of the valve 91 are similarly connected to the motor 66 by system lines 115, 116 so that the motor can be driven in opposite directions by selectively energizing the valve solenoids 91A, 91B to actuate the valve between its two operative positions. As shown, the motors 65, 66 are respectively provided with drain lines 120, 121 which are connected by passage 122 in the housing 96 to the housing reservoir 103.

When the solenoid 90A is energized, the valve 90 is operated to connect the system line 110 to line 113 and the system line 114 to the line 112. In this position of the valve, fluid from the pump 97 is supplied to the crane motor 65 through the pressure passage 98 and the connected lines 110, 113. The fluid is returned to the pump in a closed loop through the connected lines 114, 112, the valve 91, the line 111 and the pressure passage 99. Energization of the solenoid 90B is effective to reverse the crane motor 65 by connecting the pressure line 110 to the line 114. In this position of the valve 90, the fluid is returned to the pump in a closed loop via the connected lines 113, 112, the valve 91, the line 111 and the passage 99.

When the solenoid 91A is energized, fluid from the pump 97 is supplied to the hoist motor through the pressure passage 98, the line 110, the valve 90 and the connected lines 112, 115. The fluid returns to the pump in a closed loop via the connected lines 116, 111 and the passage 90. Energization of the solenoid 91B is effective to reverse the hoist motor 66 by connecting the pressure line 112 to the line 116. In this position of the valve 91, fluid returns to the pump 97 via the lines 115, 111 and the passage 99.

As will be apparent, the output torque of the motors 65, 66 can be controlled by setting the relief valves 100, 101 so that any overloads will result in a stall rather than damaging the crane 10. The fluid will be delivered to the motors 65, 66 as required by the load and up to the maximum pressure settings of the valves 100, 101.

The integral hydraulic circuit of the drive unit 80 further includes a replenishing pump 130 for making up fluid losses in the above-described fluid motor circuit and for maintaining a stable system pressure. The replenishing pump 130, which is driven by the electric motor 95, draws fluid from the reservoir 103 and is connected to the housing passages 98, 99 by an auxiliary circuit including a filter 131, and replenishing check valves 132, 133. The auxiliary circuit of the replenishing pump also includes a relief valve 134 connected between the output side of the pump and the reservoir 103.

The replenishing pump 130 also supplies fluid for actuation of the speed regulating, piston-cylinder unit 82. As shown, the pressure side of the pump is communicated to the solenoid-operated valve 87 by an external system line 140. An external exhaust line 141 connects the valve 87 to a housing passage 142 which communicates with the replenishing pump reservoir 103. The valve 87 is a three-position, four-way directional valve which is connected to opposite ends of the piston-cylinder unit 82 by system lines 143, 144. Flow rate valves 145 and by-pass check valves 146 are provided in the lines 143-144.

Energization of the valve solenoids 87A, 87B to operate the valve 87 between its operative positions is effective to actuate the piston-cylinder unit 82 in opposite directions in order to selectively position the control arm 81. As generally explained above, movement of the arm 81 controls the fluid supplied from the variable delivery pump 97 and thereby regulates the output speed of the motors 65, 66. The position of the control arm 81 as shown in FIG. 5 is a zero speed position in which the supply of fluid to the motors 65, 66 is effectively shut-off. Energization of the solenoid 87A is effective to advance the piston-cylinder unit 82 by connecting the pressure line 140 to the line 144 and the line 143 to the exhaust line 141. This causes the control arm 81 to rotate counterclockwise as viewed in FIG. 5, whereby the output from the pump 97 is increased to the maximum. Energization of the solenoid 87B retracts the piston-cylinder unit 82 by connecting the pressure line 140 to the line 143 and the line 144 to the exhaust line 141. This causes the arm 81 to be returned toward the illustrated zero speed position. Control positioning of the arm 81 in the described manner is effective to infinitely vary the motor output speeds from zero to maximum rpm depending upon the torque load and the rated output of the motors 65, 66.

Figure 6:
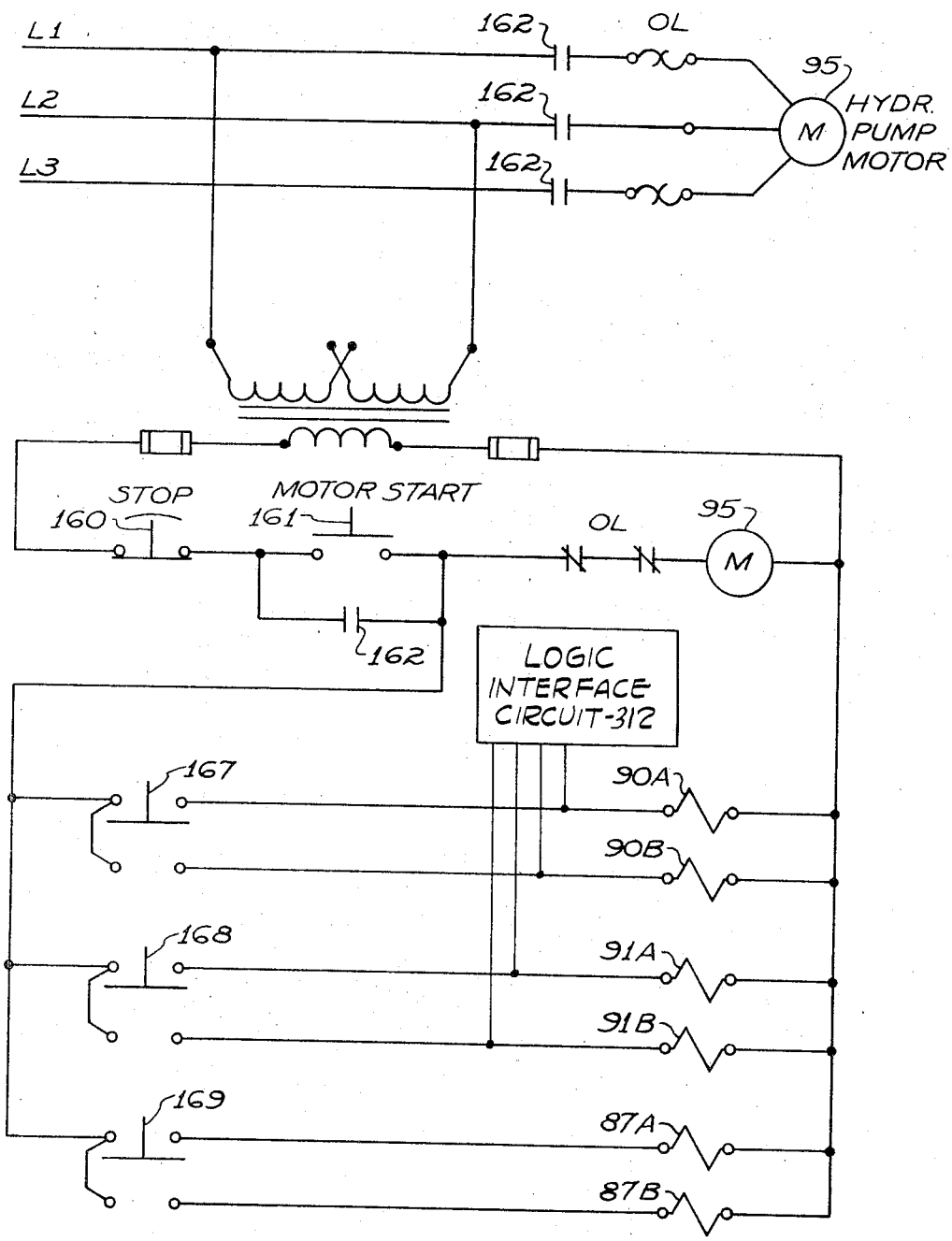
FIG. 6 shows electrical circuitry for controlling operation of the hydraulic drive system.

The control valves 87, 90, 91 may be remotely controlled through any suitable electrical control circuitry. By way of example, there is shown in FIG. 6 a simplified circuit including a motor stop switch 160 and a motor start switch 161. Actuation of the start switch 161 closes the motor relay 162 to start the pump motor 95. The motor 95 runs continuously during the entire period during which the crane 10 is in operation. A suitable selector switch 167 is provided for individually energizing the solenoids 90A, 90B of the valve 90. A second selector switch 168 is provided for selectively energizing the solenoids 91A, 91B of the valve 91. The control circuitry also includes a selector switch 169 for individually energizing the solenoids 87A, 87B of the valve 87.

Briefly summarizing the operation of the crane drive system, the valve 90 is selectively actuated to operate the crane motor 65 in either a forward or reverse direction and thereby run the crane 10 along the rails 11, 12 to a station above a tank 19. The crane is stopped at the station by deenergizing the solenoid 90A or 90B so that the valve 90 is returned to its center position blocking fluid flow to the motor 65. Thereupon the valve 91 is actuated by energization of one of the solenoids 91A, 91B to actuate the hoist motor 66 and lower the barrel 18 into the tank. Subsequently, the valve 91 is operated to reverse the motor 66 and raise the barrel 18 out of the tank. The valve 90 may then be operated to start the crane motor 65 and cause the crane to be moved along the rails to the next position. The speed of the motors 65, 66 is controlled by positioning the arm 81 through actuation of the valve 87.

Figure 7:
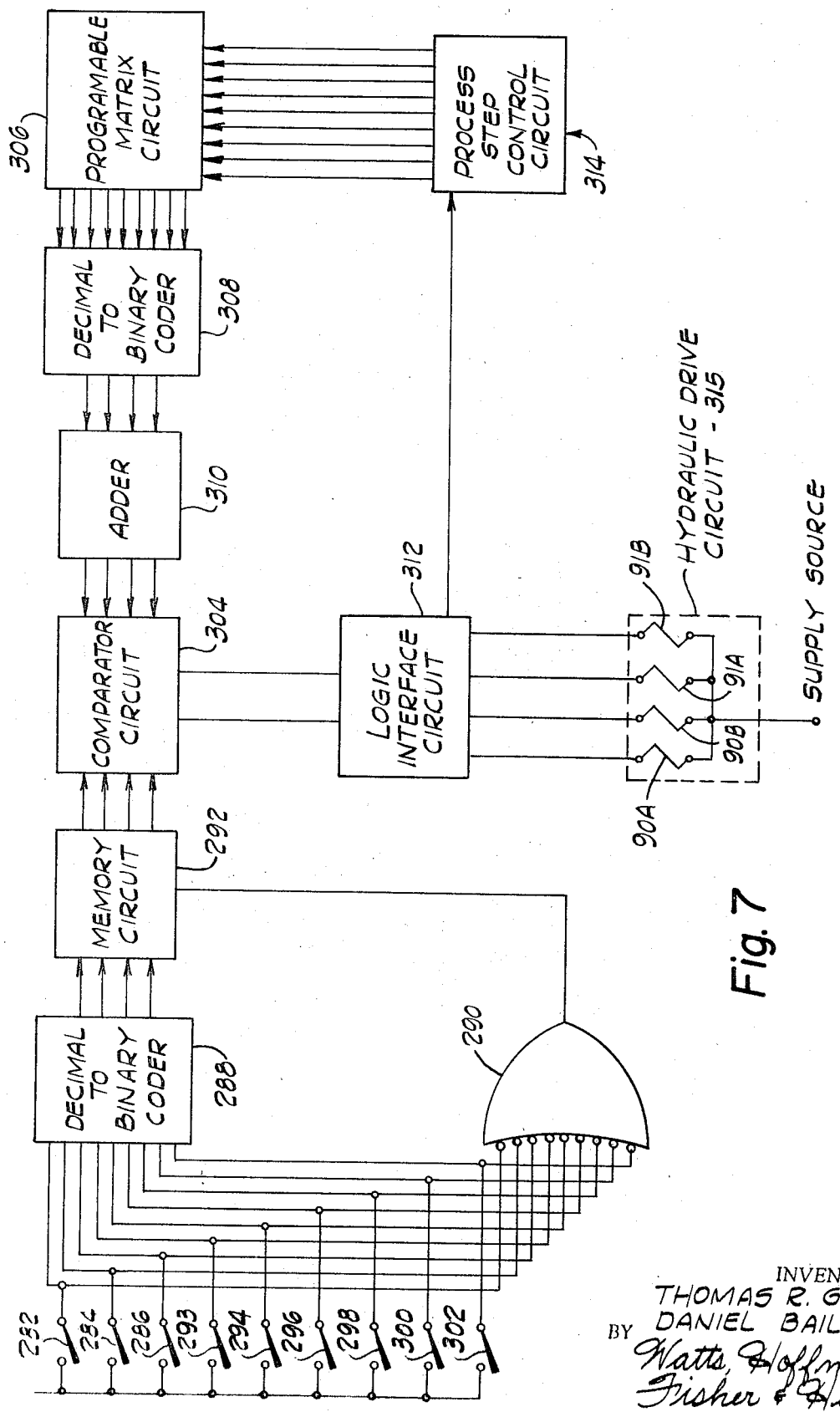
FIG. 7 is an electrical block diagram illustrating in basic form the programmable control system of the present invention.

Reference is now made to FIG. 7 which is a block diagram of the programmable control system.

One of the terminals of each of the normally-open switches 82A, 84A, 86A is connected to B+ supply source and the other terminals of each of these switches are connected to the input terminals of a decimal-to-binary coder 288 and an OR gate 290. For purposes of illustration, an additional set of normally open, magnetically actuated switches 293, 294, 296, 298, 300, 302 are connected between the B+ supply source and the input terminals of the decimal to binary coder 288 and OR gate 290.

The output terminals of the decimal to binary coder are connected to the input terminals of a memory circuit 292 and the output terminal of OR gate 290 is connected to the gating terminal of the memory circuit 292.

The output terminals of the memory gate 292 are connected to one set of the input terminals of a comparator circuit 304. Thus, the pattern of decimal signals developed by the plurality of position responsive switches 282 through 286 and 293 through 302 is converted from decimal form to binary form by the coder 288 and is applied to the memory circuit 292. When a signal is developed by any one of the switches 282 through 286 and 293 through 302 being closed, that signal is applied to the OR gate 290 to trigger the memory circuit 292 in order to apply to the comparator circuit 304 the stored pattern of binary signals.

As will be explained in greater detail, a programmable matrix circuit 306 develops a pattern of decimal signals representative of the position of a preselected work station. The pattern of signals developed by the matrix circuit 306 are converted to a pattern of binary coded signals by a decimal to binary coder 308 and are then applied to the input terminals of an adder circuit 310 and the output terminals of the adder circuit 310 are applied to the input terminals of the comparator circuit 304. Thus, the pattern of decimal signals developed by the programmable matrix circuit 306 are converted to binary coded signals and are applied to the other input terminals of the comparator circuit 304.

The comparator circuit 304 upon receiving the two patterns of binary signals developed by the memory circuit 292 and adder circuit 310, respectively, develops an output signals having a value representative of the different between the values of the patterns of input signals. For example, if the pattern of input signals developed by the memory circuit 292 is greater than the value of the pattern of input signals applied by the adder circuit 310, a first set of signals are developed by the comparator circuit. If, the pattern of signals applied to the comparator circuit by the memory circuit 292 is less than the value of the pattern of signals applied to the comparator circuit by the adder circuit 310, a second set of output signals is developed by the comparator circuit 304 and if the two patterns of input signals are of equal value, a third set of output signals is developed by the comparator circuit 304.

The sets of output signals developed by the comparator circuit 304 are then applied through a logic interface circuit 312 to the motor control solenoids 90A, 90B, 91A, 91B. Also, at the termination of energization of a selected one of the solenoids 90A, 90B, 91A, 91B, a signal is applied to the process step control circuit 314 by the logic interface circuit 312 to alter the pattern of signals developed by the process step control circuit 314. As will be described in more detail, the pattern of signals developed by the process step control circuit 314 is applied to the programmable matrix board 306 to initiate the next process step by altering the pattern of signals developed by the matrix circuit 306.

Thus, the logic interface circuit 312 upon receiving a set of signals from the comparator circuit 304 indicative of the pattern of signals applied by the memory circuit 292 being greater than the pattern of signals applied by the adder circuit 310, energizes the "reverse" solenoid 90B to thereby cause the fluid motor 65 to drive the crane 10 in a reverse direction. Similarly, when the pattern of signals applied by the adder circuit 310 to the comparator circuit 304 are of greater value than the pattern of signals applied to the comparator circuit 304 by the memory circuit 292, the logic interface circuit 312 energizes the "forward" solenoid 90A to thereby cause the fluid motor 65 to drive the crane 10 in a forward direction.

When the patterns of signals applied by the memory circuit 292 and the adder circuit 310 to the comparator circuit 304 are of equal value, the logic interface circuit 312 de-energizes the "forward" and "reverse" solenoids 90A, 90B and energizes the "descent" solenoid 91A to thereby cause the lift motor 66 to drive the hoist in a downward direction. Similarly, the "ascent" solenoid 91B is actuated by the logic interface circuit 312 to thereby cause the lift motor 66 to drive the hoist in an upward direction. The solenoids 90A, 90B, 91A, 91B are connected in common to a voltage supply source and comprise the hydraulic drive circuit 315.

Figure 8:
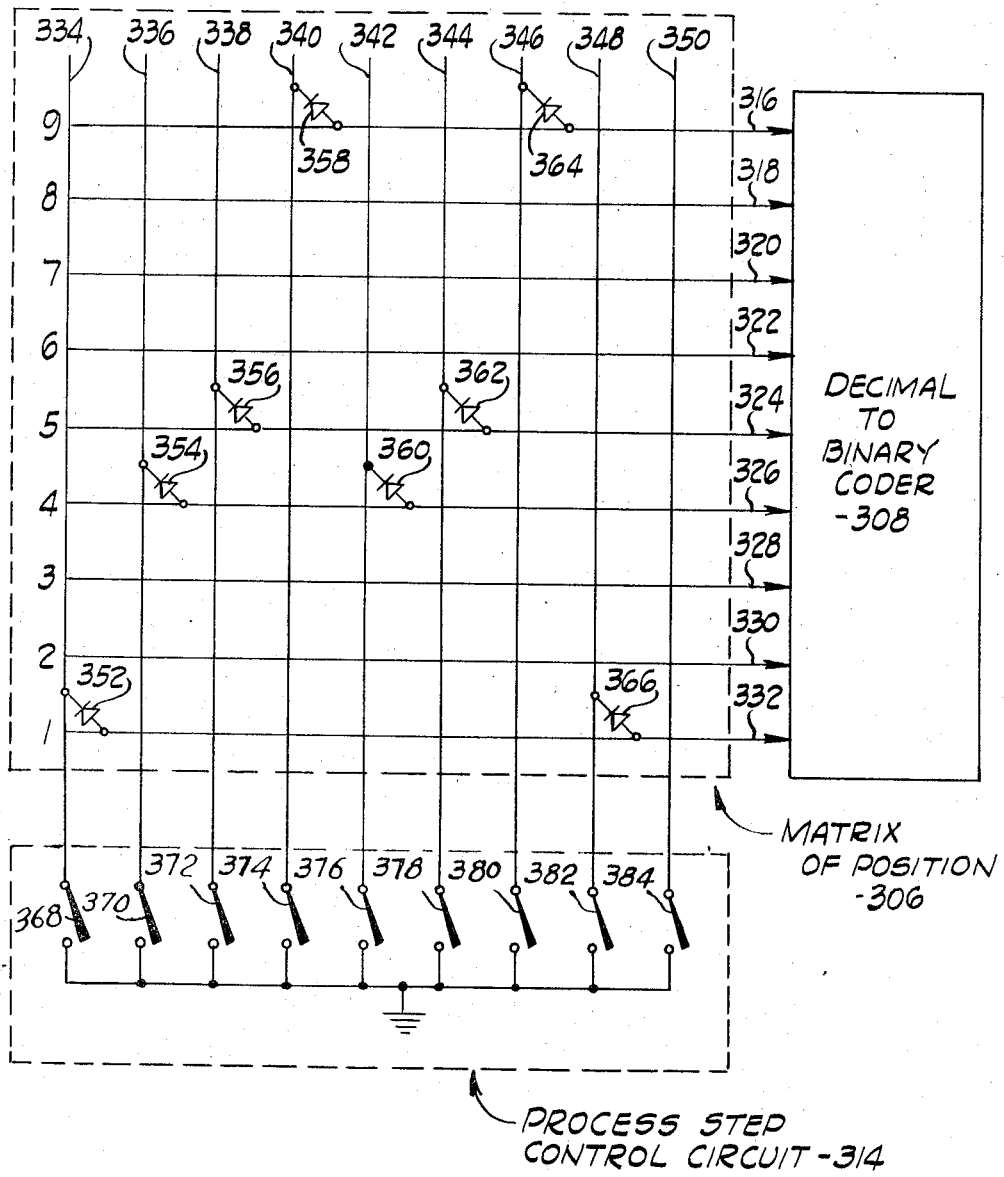
FIG. 8 is an electrical schematic diagram illustrating in more detail the program circuit incorporated in the control system of FIG. 7.

Reference is now made to FIG. 8 which illustrates in more detail the circuitry of the programmable matrix circuit 306. More particularly, the matrix circuit 306 includes a plurality of horizontally extending conductors 316 through 332 and a plurality of vertically extending conductors 334 through 350. The horizontally extending conductors 316 through 332 represent the station locations and are connected to the decimal to binary coder 308. The vertically extending conductors 334 through 350 represent the process steps and are connected to the process step control circuit 314.

Thus, in order to cause the crane to initially move to station 1, a diode is placed between the horizontally extending conductor 332 and the vertically extending conductor 334. As illustrated in FIG. 8, the diode 352 has been connected between conductors 332, 334. Similarly, in order to cause the crane to move to station No. 4 for the second process step, a diode 354 is placed between the horizontally extending conductor 326 and the vertically extending conductor 336. In a like manner, the diodes 356, 358 are placed between selected conductors in order to cause the crane to move to station No. 5 for the third process step, station No. 9 for the fourth process step, and station No. 4 for the fifth process step. Similarly, the diodes 362, 364, 366 cause the crane to move to station No. 5 for the sixth process step, station No. 9 for the seventh process step, and station No. 1 for the eighth process step.

For simplification of description, the process step control circuit 314 is illustrated as being comprised of nine normally-open switches 368 through 384 which may be sequentially moved to the closed position in order to initiate the several process steps. The process step control circuit 314 is sequenced by circuitry within the logic interface circuit 312, however, for purposes of this description, manually operated switches have been illustrated.

Thus, when the process step switch 368 is moved to the closed position, the diode 352 is coupled between ground and the lower input terminal 332 to the decimal to binary coder 308 in order to develop a pattern of signals representative of the first process step. Similarly, when the switch 370 is closed, the diode 354 is coupled between conductor 326 and ground to thereby develop a second pattern of signals representative of the second process step. In order to alter the process to be carried out by the barrel plating apparatus, it is only necessary that the diodes be moved to appropriate connection points between the plurality of horizontal conductors 316 through 332 and the plurality of vertical conductors 334 through 350. Accordingly, if it is desired to program the barrel plating apparatus to cause the crane to move to station No. 2 for the second process step, the diode 354 is merely moved from the position shown in FIG. 8 to a position interconnecting the horizontal conductor 330 and the vertical conductor 336.

Figure 9:
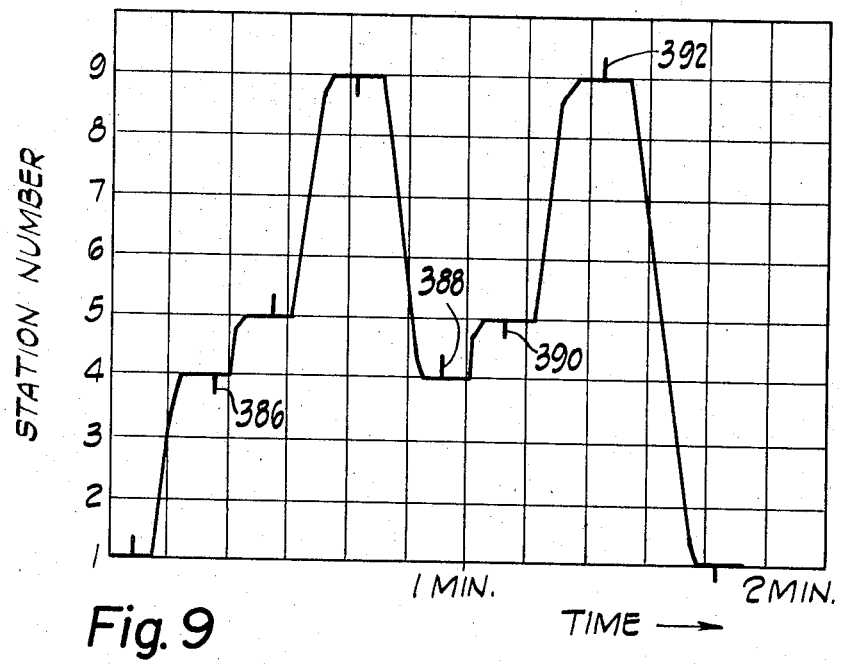
FIG. 9 is a typical time wave curve for an article plating process.

Reference is now made to FIG. 9 which illustrates a typical time wave curve for a plating process. More particularly, this curve shows that during the first time interval the crane is located at station No. 1. The crane is then moved to station No. 4 where the vertical line 386 indicates that a plating barrel is lowered into solution by the hoist. During the third process step, the crane is moved to station No. 5 and the hoist is actuated to lift a plating barrel out of the tank at position 5. The crane is then moved from station No. 5 to station No. 9 during the fourth process step where the barrel is then lowered into the plating tank situated at station No. 9. During the fifth process step the crane is moved back to station No. 4 and the barrel which was placed in the tank at station No. 4 is lifted from that tank as indicated by the vertical line 388.

The crane is then moved from station No. 4 to station No. 5 during the sixth process step and the barrel which was lifted from the tank situated at station No. 4 is then placed in the tank situated at station No. 5 as indicated by the vertical line 390. During the seventh process step, the crane is moved from station No. 5 to station No. 9 where the barrel which was earlier placed in the tank situated at station No. 9 is lifted as indicated by the vertical line 392. During the eighth process step, the crane is moved back to station No. 1 to complete a process cycle.

Figure 10:
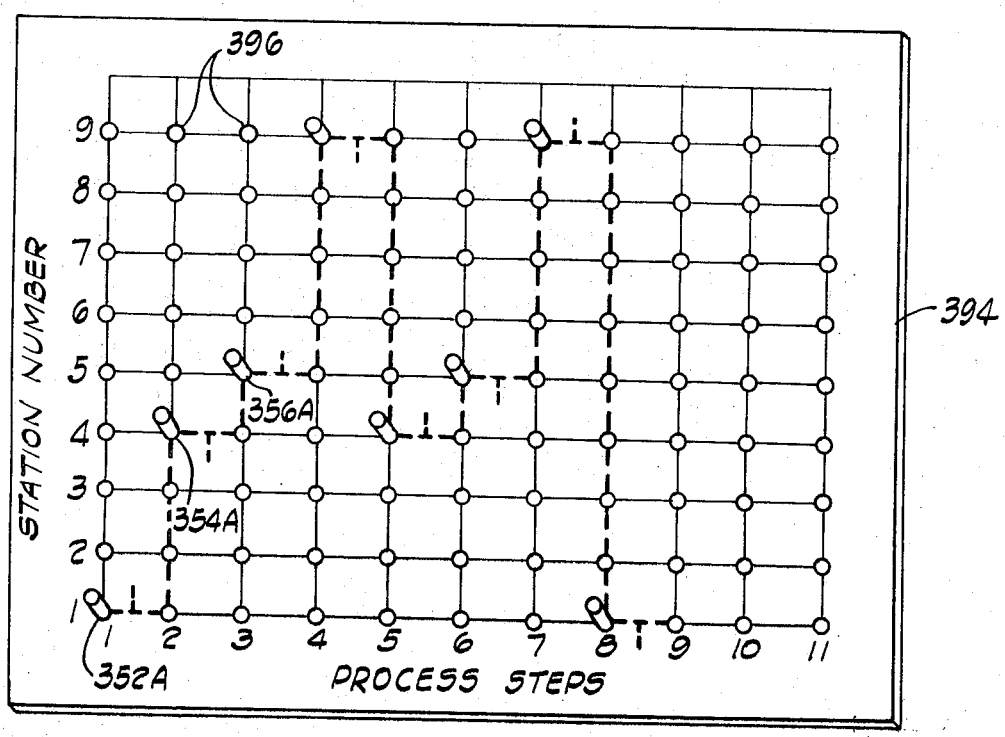
FIG. 10 is a program board which is utilized with the control system of FIG. 7 and which is programmed to carry out the plating process illustrated in the time wave curve of FIG. 9; and, FIG. 11 is an electrical block diagram illustrating in more detail a portion of the control system illustrated in FIG. 7.

FIG. 10 illustrates the program board 394 for the control system of the preferred embodiment of the present invention. More particularly, the program board 394 has a plurality of apertures 396 extending therethrough and each adapted to receive a diode pin such as the diode pins 352A, 354A, 356A. The diode pins 352A, 354A, 356A correspond to the diodes 352, 354, 356, respectively, in FIG. 8 and complete a circuit between the corresponding horizontal and vertical conductors.

As is apparent from a comparison of FIGS. 9 and 10, the operator merely inserts a diode pin at a selected station number for each of the process steps. Thus, with the pin 352A inserted at station No. 1 for the first process step, the crane 10 commences a cycle at station No. 1. With the diode pin 354A inserted at station No. 4 for the second process step, the crane moves to station No. 4 for the second process step. In a like manner, the crane subsequently moves to stations Nos. 5, 9, 4, 6, 9, and 1. With such an arrangement, the operator may very simply program any desired process directly from the time wave curve for that particular process.

Figure 11:
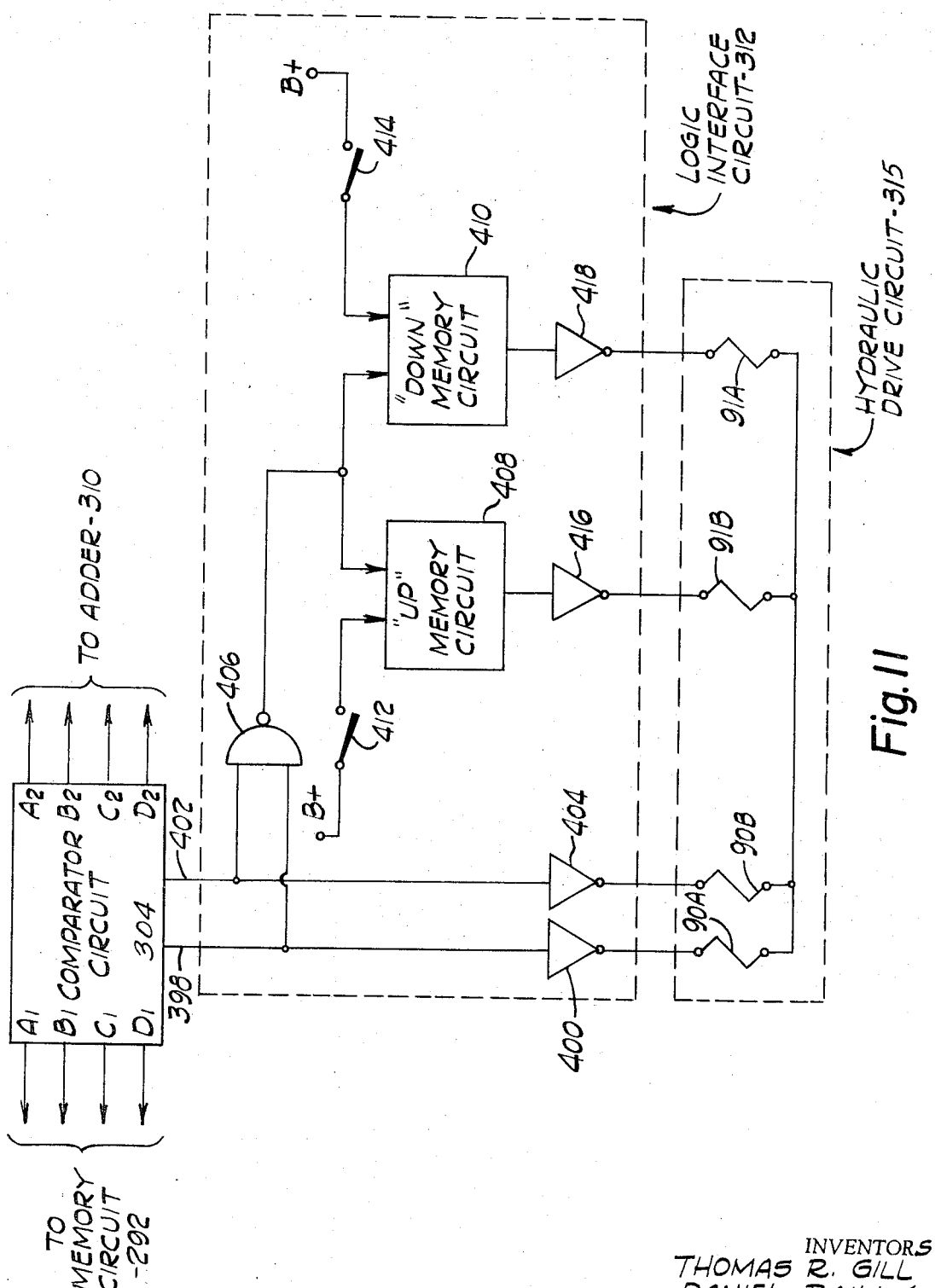

Reference is now made to FIG. 11 which illustrates in more detail the logic interface circuit 312 and the connections between this circuit and the hydraulic drive circuit 315. More particularly, the input terminals $A_1$, $B_1$, $C_1$, $D_1$ of the comparator circuit 304 are connected to the memory circuit 292 and the input terminals $A_2$, $B_2$, $C_2$, $D_2$ of the comparator circuit 304 are connected to the adder circuit 310. One of the output terminals 398 of the comparator circuit 304 is connected through an isolation amplifier 400 to the "forward" solenoid 90A. The other output terminal 402 of the comparator circuit 304 is connected through another isolation amplifier 404 to the "reverse" solenoid 90B. The output terminals 398, 402 of the comparator circuit 304 are also connected to the input terminals of an AND gate 406 having its output terminal connected to one of the input terminals of an "up" memory circuit 408 and one of the input terminals of a "down" memory circuit 410. The other input terminal of the "up" memory circuit is connected through a normally open sensing switch 412 to a B+ supply source. Similarly, the other input terminal of the "down" memory circuit 410 is connected through a normally open sensing switch 414 to the B+ supply source.

The output terminal of the "up" memory circuit 408 is connected through an isolation amplifier 416 to the "ascent" solenoid 91B and the "down" memory circuit 410 is connected through an isolation amplifier 418 to the "descent" solenoid 91A. The solenoids 90A, 90B, 91A, 91B are connected in common to a voltage supply source.

Accordingly, when an output signal is developed only on output terminal 398 of the comparator circuit 304, the amplifier 400 energizes the "forward" solenoid 90A. Similarly, when an output signal is developed only on output terminal 402 of comparator circuit 304, the amplifier 404 energizes the "reverse" solenoid 90B. When an output signal is developed on both of the output conductors 398, 402, the AND gate 406 is gated to apply a signal to both the "up" memory circuit 408 and the "down" memory circuit 410. If the sensing switch 412 is in a closed position, i.e., the crane is in a down position, the "up" memory circuit is actuated to energize the "ascent" solenoid 91B through the amplifier 416. Similarly, if the sensing switch 414 is in the closed position, i.e., the hoist is in the up position, the "down" memory circuit 410 is actuated to energize the "descent" solenoid 91A to move the hoist to a down position.

With the disclosed programmable control system, it is possible for an operator to easily program any desired process from a time-wave curve, such as the curve of FIG. 9. In addition, it is not necessary for the operator to program a direction of movement in that the comparator circuit 304 evaluates the actual position of the carriage and the programmed position in order to develop an output signal corresponding to the necessary direction of travel. Thus, the present invention overcomes the noted disadvantages of previous article transporting systems.

The invention has provided a novel hydraulic crane drive system characterized in part by closed loop circuitry, whereby fluid supplied to either of the motors 65, 66 is returned directly to the variable delivery pump 97 rather than to a reservoir. It will be seen that the system permits fast starting and stopping, together with infinitely variable speed control. All of these advantages are obtained in a system which is not subject to the maintenance problems encountered with conventional electrically powered cranes.

Many variations and modifications of the invention will be apparent to those skilled in the art in the detailed disclosure Therefore, it is to be understood that, within the scope of the appended claims, the invention can be practiced otherwise than as specifically shown and described.

Having thus described our invention, we claim:

1. A programmable material handling apparatus for conveying work loads over a path of travel defined by a longitudinal runway to selected work stations spaced along said path of travel, said apparatus being actuatable through repeated cycles of acceleration, deacceleration and stopping during movement over said path of travel, comprising:

a. hoist support means engaged on said runway for movement over said path of travel to the selected work stations;
b. load hoist means carried by said support means;
c. a hydraulic drive system carried on said apparatus for actuating it through said cycles of acceleration, deacceleration, and stopping;
d. said drive system including fluid motor means operatively connected to said movable support, pump means for supplying fluid to said motor means, closed loop hydraulic circuit means connecting said pump means to said motor means so that fluid supplied to said motor means is returned directly to said pump means;
e. a plurality of position sensing means for developing a pattern of control signals representative of the actual position of said movable support along a workpath;
f. programmable circuit means for developing a predetermined pattern of program signals representative of the position of a preselected work station, said programmable circuit means including a program board and a control circuit having a plurality of circuit connection means positioned on said board at positions corresponding to the positions of said work stations along said workpath, said control circuit having an output circuit means for developing a pattern of signals corresponding to a preselected program, and actuatable switching means for actuating selected ones of said circuit connection means to program said control circuit, said actuatable switching means being diodes which may be removably inserted into said program board for completing selected ones of a plurality of circuit connections;
g. comparator circuit means for developing a control signal having a value representative of the difference between the value of said pattern of program signals and the value of said pattern of control signals; and,
h. said hydraulic circuit means coupled to said comparator means for controlling the fluid supplied to said motor means in response to said control signal developed by said comparator means to thereby energize said fluid motor means for driving said movable support from said actual position to a preselected work station.

2. A programmable material handling apparatus for conveying work loads over a path of travel defined by a longitudinal runway to selected work stations spaced along said path of travel, said apparatus being actuatable through the repeated cycles of acceleration, deacceleration and stopping during movement over said path of travel, comprising:
a. hoist support means engaged on said runway for movement over said path of travel to the selected work stations;
b. load hoist means carried by said support means;
c. a hydraulic drive system carried on said apparatus for actuating it through said cycles of acceleration, deacceleration, and stopping;
d. said drive system including fluid motor means operatively connected to said movable support, pump means for supplying fluid to said motor means, closed loop hydraulic circuit means connecting said pump means to said motor means so that fluid supplied to said motor means is returned directly to said pump means;
e. a plurality of position sensing means for developing a pattern of control signals representative of the actual position of said movable support along a workpath, said position sensing means including circuit means for developing a pattern of digital signals;
f. programmable circuit means for developing a predetermined pattern of program signals representative of the position of a preselected work station, said programmable circuit means including a program board and a control circuit having a plurality of circuit connection means positioned on said board at positions corresponding to the positions of said work stations along said workpath, said control circuit having an output circuit means for developing a pattern of signals corresponding to a preselected program, and actuatable switching means for actuating selected ones of said circuit connection means to program said control circuit;
g. comparator circuit means for developing a control signal having a value representative of the difference between the value of said pattern of program signals and the value of said pattern of control signals; and,
h. said hydraulic circuit means coupled to said comparator means for controlling the fluid supplied to said motor means in reponse to said control signal developed by said comparator means to thereby energize said fluid motor means for driving said movable support from said actual position to a preselected work station.

3. An apparatus as defined in claim 2 wherein said control circuit includes a digital to binary coder means for converting said pattern of digital coded signals to a pattern of binary coded signals.

4. An apparatus as defined in claim 3 wherein said programmable circuit includes an output circuit means for developing a pattern of binary signals having a value representative of the position of a preselected work station.

5. A programmable material handling apparatus for conveying work loads over a path of travel defined by a longitudinal runway to selected work stations spaced along said path of travel, said apparatus being actuatable through repeated cycles of acceleration, deacceleration and stopping during movement over said path of travel, comprising:
a. hoist support means engaged on said runway for movement over said path of travel to the selected work stations;
b. load hoist means carried by said support means;
c. a hydraulic drive system carried on said apparatus and including a first positive displacement fluid motor; means connecting said first motor to said support for imparting movement thereto; a second positive displacement fluid motor; means connecting said second motor to said hoist means; a hydraulic drive unit for supplying fluid to said motors; said drive unit including a variable delivery pump and first and second passages connected to opposite sides of said pump; and hydraulic circuit means forming a closed loop hydraulic circuit connecting said motors in series to said first and second passages of said drive unit, said means forming said circuit including first and second three-position, four-way directional valves, said first valve having a first port connected to said first passage, second and third ports connected to opposite sides of said first motor and a fourth port connected to a first port of said second valve, said second valve having second and third ports connected to opposite sides of said second motor and a fourth port connected to said second passage, said pump including selectively positionable control means for controlling the output of fluid and thereby regulating the speed of said motors, and including a piston-cylinder means connected to control means for moving said control means to selected positions;

d. a plurality of position sensing means for developing a pattern of control signals representative of the actual position of said movable support along a workpath;

e. programmable circuit means for developing a predetermined pattern of program signals representative of the position of a preselected work station;

f. comparator circuit means for developing a control signal having a value representative of the difference between the value of said pattern of program signals and the value of said pattern of control signals; and, g. said hydraulic circuit means coupled to said comparator means for controlling the fluid supplied to said first motor in response to said control signal developed by said comparator means to thereby energize said first fluid motor for driving said movable support from said actual position to a preselected work station.

6. Apparatus as claimed in claim 5 wherein said drive unit includes a second pump, and fluid circuit means connecting said second pump to said piston-cylinder means, said fluid circuit means including directional valve means for controlling operation of said piston-cylinder means.

7. A programmable material handling apparatus for conveying work loads over a path of travel defined by a longitudinal runway to selected work stations spaced along said path of travel, said apparatus being actuatable through repeated cycles of acceleration, deacceleration and stopping during movement over said path of travel, comprising:

a. hoist support means engaged on said runway for movement over said path of travel to the selected work stations;

b. load hoist means carried by said support means;

c. a hydraulic drive carried on said apparatus for actuating it through said cycles of acceleration, deacceleration, and stopping;

d. said drive system including fluid motor means operatively connected to said movable support, pump means for supplying fluid to said motor means, closed loop hydraulic circuit means connecting said pump means to said motor means so that fluid supplied to said motor means is returned directly to said pump means;

e. a plurality of position sensing means for developing a control signal representative of the actual position of said movable support along a workpath;

f. programmable means including a program board and a control circuit having a plurality of circuit connection means positioned on said board at positions corresponding to the positions of said work stations along said workpath, said control circuit having an output circuit means for developing a program signal corresponding to a preselected program, and actuatable means for actuating selected ones of said circuit connection means to program said control circuit, said actuatable means being diodes removably insertable into the program board for completing selected ones of a plurality of circuit connections;

g. output circuit means for developing an output signal having a value representative of the value of said program signal and the value of said control signal; and, h. said hydraulic circuit means coupled to said output circuit means for controlling the fluid supplied to said motor means in response to said output signal developed by said output circuit means to thereby energize said fluid motor means for driving said movable support from said actual position to a preselected work station.

8. An apparatus as defined in claim 7 wherein the position sensing means includes circuit means for developing a pattern of digital coded signals.

9. An apparatus as defined in claim 8 wherein said programmable means includes a digital-to-binary coder means for converting said pattern of digital coded signals to a pattern of binary coded signals.

10. A programmable material handling apparatus for conveying work loads over a path of travel defined by a longitudinal runway to selected work stations spaced along said path of travel, said apparatus being actuatable through repeated cycles of acceleration, deacceleration and stopping during movement over said path of travel, comprising:

a. hoist support means engaged on said runway for movement over said path of travel to the selected work stations;

load hoist means carried by said support means;

c. a hydraulic drive carried on said apparatus for actuating it through said cycles of acceleration, deacceleration, and stopping;

d. said drive system including fluid motor means operatively connected to said movable support means, pump means for supplying fluid to said motor means, and closed loop hydraulic circuit means connecting said pump means to said motor means so that fluid supplied to said motor means is returned directly to said pump means;

e. a plurality of position sensing means for developing a pattern of control signals representative of the actual position of said hoist support means along such runway;

f. programmable circuit means coupled to said plurality of position sensing means for developing a predetermined pattern of program signals each representative of the position of a preselected work station;

g. control circuit means coupled to said programmable circuit means for developing a plurality of control signals each having a value representative of one of said program signals, said programmable circuit means including a program board and a control circuit having a plurality of circuit connection means positioned on said board at positions corresponding to the positions of said work stations along said workpath, said control circuit having an output circuit means for developing a pattern of signals corresponding to a preselected program, and actuatable switching means for actuating selected ones of said circuit connection means to program said control circuit, said actuatable switching means being diodes which may be removably inserted into the program board for completing selected ones of a plurality of circuit connections; and, h. said hydraulic circuit means coupled to said control circuit means for controlling the supply of fluid in response to said control signals developed by said control circuit means for energizing said fluid motor means for driving said hoist support means to preselected work stations.

11. An apparatus as defined in claim 10 including position sensing means for developing a pattern of output signals representative of the actual position of said movable support along a workpath.

12. An apparatus as defined in claim 11 wherein said control circuit means includes comparator circuit means coupled to said position sensing means and said programmable circuit means for developing a said output signal having a value representative of the difference between the value of a said pattern of control signals and the value of a said pattern of output signals.

* * * * *

UNITED STATES PATENT OFFICE
CERTIFICATE OF CORRECTION

Patent No. 3,851,766    Dated December 3, 1974

Inventor(s) Thomas R. Gill and Daniel Bailly

It is certified that error appears in the above-identified patent and that said Letters Patent are hereby corrected as shown below:

ABSTRACT:

Column 2, line 5, delete "to" and substitute -- in --

IN THE CLAIMS:

Column 16, line 38, insert -- b. --

Signed and sealed this 4th day of March 1975.

(SEAL)
Attest:

RUTH C. MASON
Attesting Officer

C. MARSHALL DANN
Commissioner of Patents
and Trademarks